April 16, 1929. K. M. NAHIKIAN ET AL 1,709,226
PROCESS OF CALCINING LIME
Filed April 27, 1928
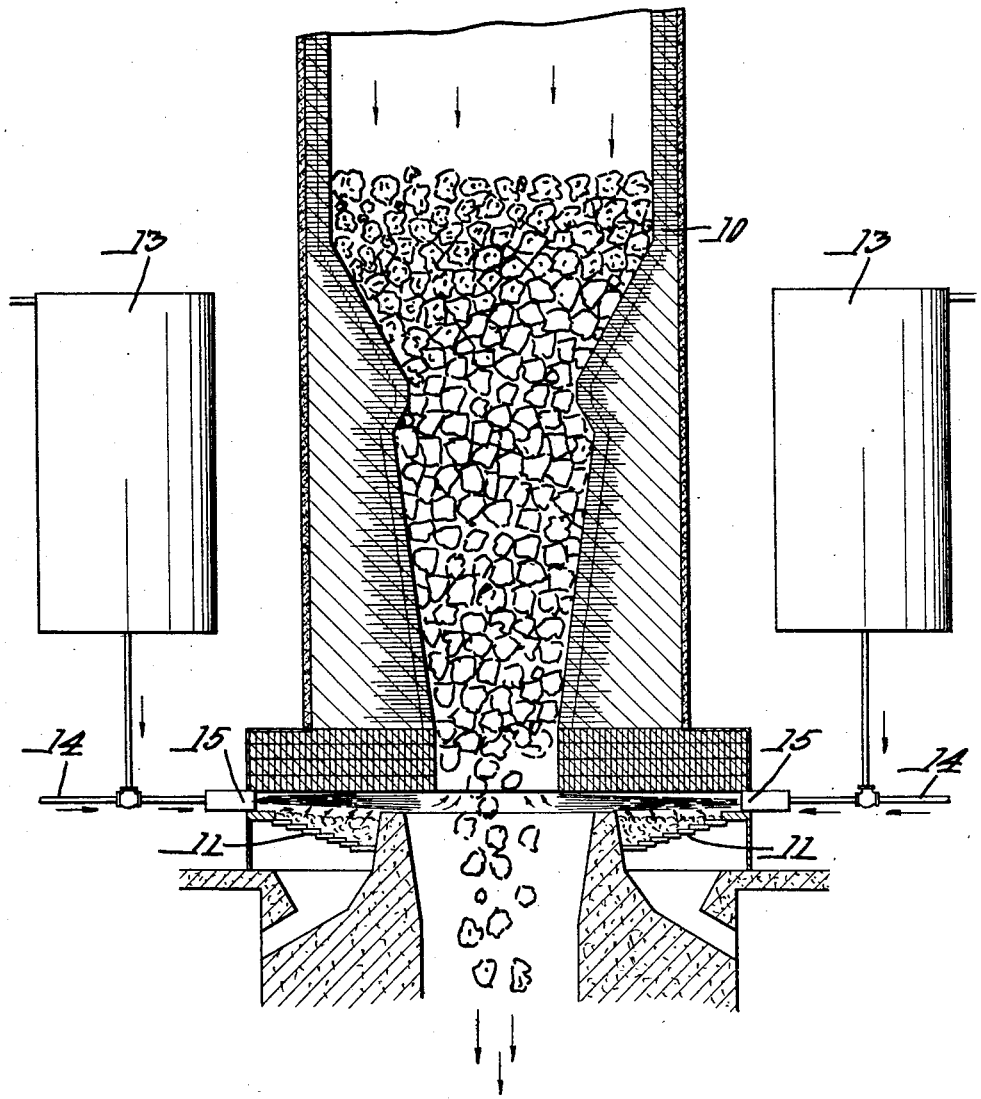

Patented Apr. 16, 1929.

1,709,226

UNITED STATES PATENT OFFICE.

KISSAG M. NAHIKIAN, OF WORCESTER, MASSACHUSETTS, AND ROBERT W. FOSTER, OF BURLINGTON, VERMONT, AND EDGAR T. BELDEN, OF NEW YORK, N. Y., ASSIGNORS TO BREWER & COMPANY, INC., OF WORCESTER, MASSACHUSETTS, A CORPORATION OF MASSACHUSETTS.

PROCESS OF CALCINING LIME.

Application filed April 27, 1928. Serial No. 273,390.

This invention relates to the calcining of the compounds of calcium or other alkaline earth metals.

The principal objects of the invention are to provide a convenient and inexpensive way of removing certain impurities in the fuel used for heating the kilns in which the material is calcined and thereby improving the plasticity and other qualities of the products.

Other objects and advantages of the invention will appear hereinafter.

Reference is to be had to the accompanying drawing which is a diagrammatic sectional view of a lime kiln showing a preferred way of carrying out the process which is the subject of this invention.

In the calcining of limestone using fuel containing sulphur, it has been found in practice that the impurities in such fuel, particularly the sulphur, convert a considerable percentage of the lime into insoluble compounds, which become mixed with the product and effecting their plasticity and setting qualities and also that these impurities increase the amount of waste that has to be taken out of the kiln at the bottom and thus increase the cost of operation in this manner. Similar difficulties occur in corresponding processes for treating compounds of other alkaline earth metals.

Referring to the drawing it will be seen that the ordinary kiln 10 is heated by the combustion of the fuel on grates 11, located at the bottom and that the limestone or other raw material which is introduced in large lumps usually comes down through and is deposited in the space between the grates or at the front or rear. This is the usual practice.

Now it is clear that if, for example, sulphur is in the fuel, which is true of practically all coals and petroleum products available for use in such processes, sulphur dioxide is formed when the fuel is burned and this acts upon the material being calcined, causing the formation of insoluble compounds and other impurities, the main portion of which comes down with the product and also produces lumps in the waste which have to be removed at considerable expense as they form a material percentage thereof. The product can never be purified by ordinary methods in such a way as to eliminate these impurities which are very detrimental but these impure products are sold on the market for building purposes and for the other uses for which the lime is produced.

This process consists in introducing into the lower portion of the kiln or furnace, preferably under steam or air pressure, in such proportions as may be required, a material for reacting with the sulphur dioxide before the calcining process starts and thus removing these impurities.

We prefer to use a mixture of water with oxide of lime or other alkaline earth metals directly over the grates. This is introduced in a wide and thin spray of liquid or we can introduce the same in the form of a gaseous mixture of a dry dust. Whichever way it is introduced it produces the same chemical action practically as would be produced in the body of the material being treated and the reaction takes place at a lower level in the furnace or kiln and takes out practically all the sulphur as well as some other impurities.

It is shown in this case as being introduced from a pair of tanks 13, full of water in which the oxide or hydroxide of an alkaline earth metal is mixed. By introducing steam or air pressure through a pipe or nozzle 14, the alkaline solution is forced through a nozzle 15, preferably one at each side, into the combustion chamber of the kiln in a substantially horizontal flat spray, which extends throughout the area of the combustion chamber of the kiln and catches all sulphur fumes. The sulphur compound is precipitated at the start and the sulphur does not get into the material above. This precipitate is taken care of in any desired way, as by drawing it out at the side. It is found to be of a quantity of only a very small percentage of that produced in the usual way. In the past, ten to twenty percent of the entire product was found to be deleterious substances. We have found that by this process this amount can be reduced as low as less than one percent.

It has also been found that oxides or hydroxides of barium can be successfully used with excellent results to produce the desired qualities in the resultant lime. Sodium, or barium or calcium chloride also can be added in this manner in case fuel of a different analysis is employed and the process is applied to other chemical treatments in which the value of the product is enhanced by using such chlorides. In fact this furnishes a suitable medium for introducing any material that may be required in the process.

The process can be carried out in a vertical, rotary or other form of kiln using lump, pulverized, gaseous or liquid fuel containing sulphur.

We have also found, when the proper regulation and control of the alkaline earth oxides or hydroxides in a solution of water sprayed as mentioned above in the right proportion is employed, that the resultant oxides of lime are practically free from the objectionable lime and sulphur compounds. This process also can be used successfully in the manufacture of face brick and other materials on which sulphur in the fuel has detrimental effects.

By the use of this process the purity of the product is very greatly improved to such an extent that it is already recognized in the building industry as a materially improved product. Also the waste is reduced and the labor of removing the waste is much less expensive than has been the case heretofore.

Although we have specified only a limited number of ways of carrying out the process we are aware of the fact that other modifications can be made therein by any person skilled in the art without departing from the scope of the invention as expressed in the claims. Therefore we do not wish to be limited in this respect but what we do claim is:—

1. The method of calcining compounds of alkaline earth metals which comprises the feeding of the raw material along a path, heating the same by fuel containing sulphur, and introducing an oxide or hydroxide of an alkaline earth metal in advance of the raw material for the purpose of precipitating neutralizing or absorbing the products produced by the burning of such fuel, the moisture and the oxide or hydroxide before the products of combustion act on the raw material.

2. The method of calcining compounds of alkaline earth metals which comprises the feeding of the raw material along a path, heating the same by fuel containing sulphur toward which the raw material is fed, and introducing in finely divided form an oxide or hydroxide of an alkaline earth metal into the combustion chamber before the raw material is brought into a position to be acted upon by it, to combine impurities in the fuel containing sulphur, moisture and the alkaline earth metal oxide or hydroxide.

3. The method of calcining limestone which consists in feeding the limestone down in a kiln, burning fuel containing sulphur, and introducing a spray of alkaline earth metal oxide or hydroxide into the combustion chamber or above the fuel, whereby the impurities in the fuel will react with the spray and be neutralized before they reach the limestone.

4. The method of calcining limestone and the like which consists in introducing in the form of a spray, a mixture of oxide or hydroxide of an alkaline earth metal and water into the bottom of a kiln in such a position as to come into contact with the products of combustion from the fuel before said products reach the limestone to be treated, and precipitating the hard and non-plastic products, thus produced, for the purpose described.

5. The method of calcining limestone which consists in feeding the limestone into a fuel containing sulphur, introducing into the combustion chamber of such kiln a spray of oxide or hydroxide of an alkaline earth metal whereby the sulphur in the fuel will react with the spray to form sulphur compounds and prevent corresponding action on the lime produced.

In testimony whereof we have hereunto affixed our signatures.

KISSAG M. NAHIKIAN.
ROBERT W. FOSTER.
EDGAR T. BELDEN.